United States Patent

Kosco

[15] 3,684,926
[45] Aug. 15, 1972

[54] ALTERNATING CURRENT STATIC CONTROL SYSTEM

[72] Inventor: William C. Kosco, Southfield, Mich.

[73] Assignee: La Salle Machine Tool, Inc., Warren, Mich.

[22] Filed: July 26, 1971

[21] Appl. No.: 166,056

[52] U.S. Cl.............................317/148.5 R, 307/210
[51] Int. Cl..............................................H01h 47/32
[58] Field of Search........307/210; 317/134, 148.5 R, 317/148.5 B

[56] References Cited

UNITED STATES PATENTS

| | | | |
|---|---|---|---|
| 2,748,269 | 5/1956 | Slutz | 307/210 X |
| 3,026,505 | 3/1962 | Bevilacqua | 317/148.5 B |
| 3,329,869 | 7/1967 | Obenhaus | 317/148.5 B |

Primary Examiner—A. D. Pellinen
Attorney—Finn G. Olsen et al.

[57] ABSTRACT

An alternating current solid state control system utilizing alternating current AND and OR alternating current solid state control logic elements. The alternating current logic elements perform their logic functions by comparing the voltage drop across a resistor to a predetermined reference voltage, the voltage drop being caused by the logical input state of the logic element. Each element's output can be used as a feedback to its own inputs or can be connected to the inputs of electrically similar circuits. By the use of multiple logical inputs, various feedback connections, and various combinations of the alternating current logic elements complex logic functions can be generated to control mechanical apparatus.

10 Claims, 2 Drawing Figures

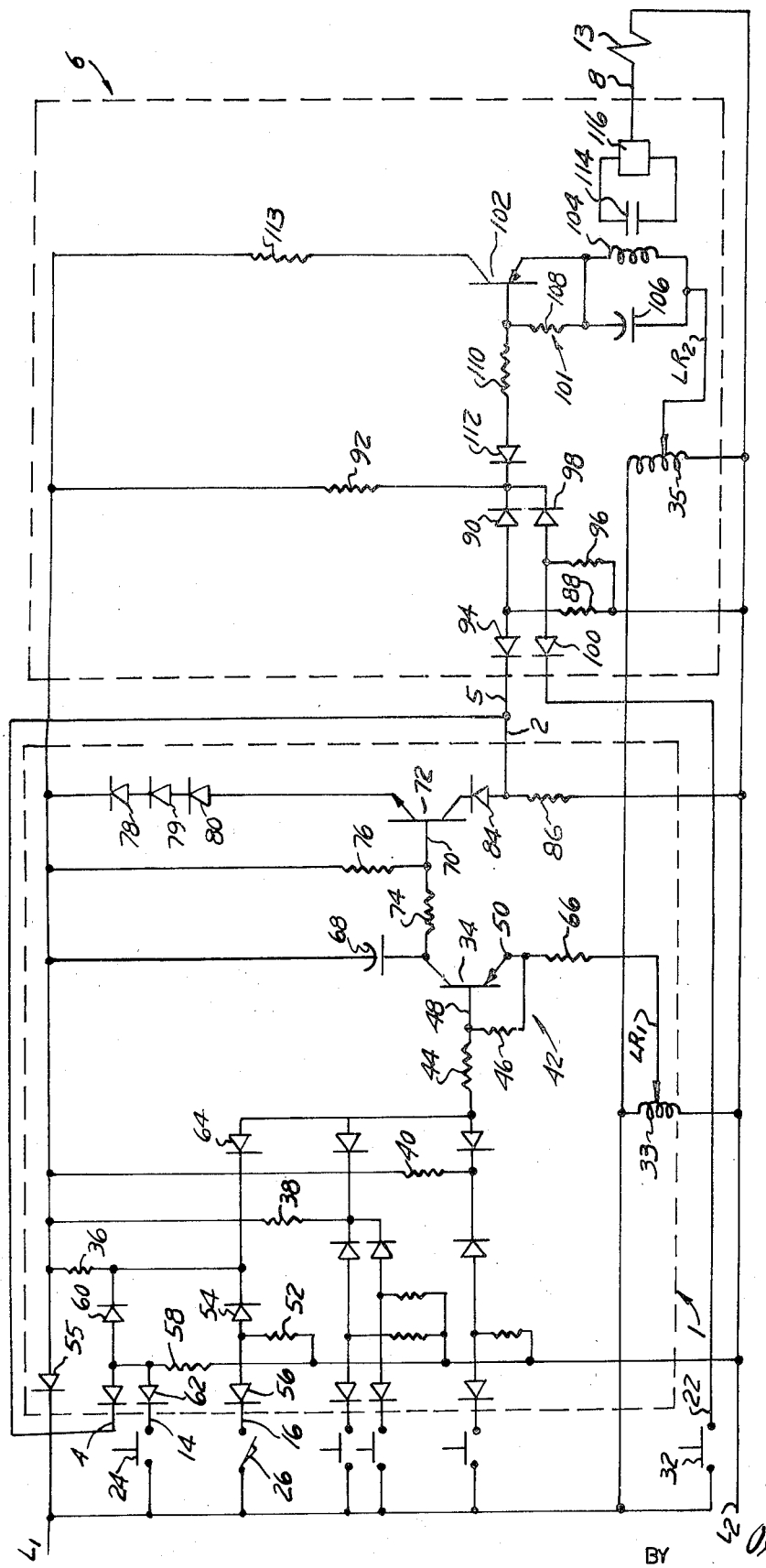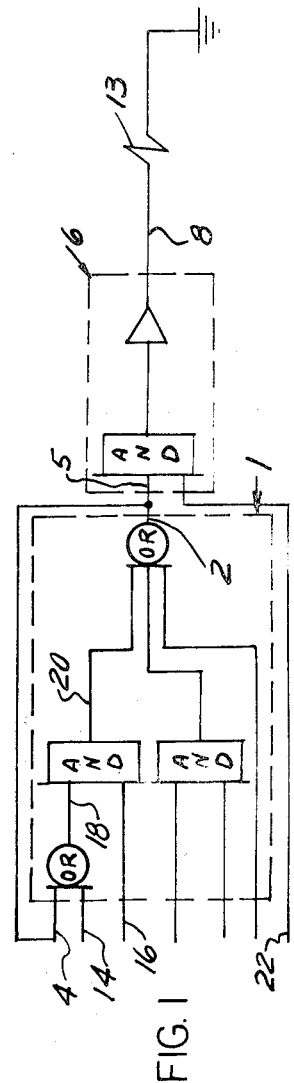

ALTERNATING CURRENT STATIC CONTROL SYSTEM

BACKGROUND OF THE INVENTION

The use of electronic elements for generating logic functions for mechanical apparatus control such as machine control is well known. Such logic control has conventionally been accomplished by the use of direct current logic elements. While machine tools and associated apparatus such as motors, starters, solenoids, etc., used alternating current, the logic control elements required direct current. Therefore an expensive and complex AC to DC conversion was necessary. This invention will eliminate the problems of AC to DC conversion conventionally required in machine tool control systems. Complex logic functions can be generated directly from AC signals by using combinations of AC logic elements, feedback loops, and multiple function inputs. The complex functions can then be amplified and used directly to control AC mechanical apparatus.

SUMMARY OF THE INVENTION

The system of this invention employs a solid state parallel logic network in which all input and output signal devices are connected to a common power bus. This enables the AC logic components to display their signal status totally independent of any other signal condition. The logical state of an element can thus be determined without knowledge of the logical state of an adjacent element, unlike conventional systems which use serial logic or relay devices. The system of this invention is assembled so that a predetermined voltage drop across a resistor in the system occurs in response to the existence of the logic function which the system is to perform. In response to the existence of this voltage drop, current from a reference voltage line can flow through the resistor so as to trigger an associated transistor and provide for the desired current flow indicating the existence of the predetermined logic function. More specifically, in the AND gate form of applicant's system, the predetermined voltage drop across the resistor occurs only when conditions exist allowing current to flow through all of the input lines in the AND gate system. In the OR gate system of this invention, the predetermined voltage drop across the resistor occurs in response to flow of current through any one of the input lines for the OR gate system. As a result, the system of this invention enables the performing of logic functions corresponding to the logic functions obtainable with conventional DC solid state control logic elements directly from the AC signals thus eliminating the conventional requirement for initially converting AC to DC signals.

Each element can be designed with a number of inputs configured into various logical functions. While as a practical matter there is a limit on the number of inputs, the ability to use the low power output of a low output power logic element as a feedback to its own inputs or to drive the inputs of other electrically similar elements yields the possibility of generating an infinite number of logic functions to be used in controlling mechanical apparatus. After the desired function has been generated for the specific application a high output power AC logic element provides a high power output to the actual mechanical apparatus to be controlled.

Further objects, features and advantages of this invention will become apparent from a consideration of the following description, the appended claims, and the accompanying drawing in which:

FIG. 1 is the logical function diagram; and
FIG. 2 is the wiring schematic for implementation of the logical function of FIG. 1.

With reference to FIG. 1, the block diagram shows a multiple input logic element system 1, indicated by the broken line, with its low power output 2 being used as a feedback to input line 4 and being used to drive an electrically similar input line 5 of logic element system 6. The high power output 8 of logic element 6 is connected to an AC load 13 (e.g. solenoid, starter, etc.).

Various combinations of input signals will give an output at 8. If the presence of a signal is a "1" state and the absence of a signal is an "0" state then a "1" on lines 14 and 16 will produce a "1" on line 18, a "1" on line 20, a "1" on line 2, a "1" at the feedback input line 4, and a "1" at input line 5 of logic element 6. If then line 14 subsequently returns to a "0" the "1" at line 4 will maintain the output 2 of system 1 in a "1" state. The addition of a "1" at line 22 will then produce a "1" at output 8 which drives the AC load 13.

With reference to FIG. 2, the switches 24, 26 and 32 are connected to the respective input lines 14, 16, and 22. Closing a switch produces a signal condition or a "1" state. An open switch represents no signal or an "0" state. Thus as the description will demonstrate, the circuit can perform the same complex logic functions of the block diagram of FIG. 2 using AC signals to perform those logical functions.

The lines $L_1$ and $L_2$ are connected to a conventional AC voltage source with a voltage thereacross of for example 110 volts. $LR_1$ and $LR_2$ are reference voltages obtained through an intermediate connection to autotransformers 33 and 35 respectively, the voltage from $L_1$ to $LR_1$ or $LR_2$ being for example 40 volts. The purpose of system 1 is to provide current through transistor 34 in response to a predetermined voltage condition on either resistor 36, 38, or 40.

The predetermined voltage drop on resistor 36, for example, that causes current to flow in circuit 42 through base current limiting resistor 44 is established by biasing resistor 46 connected to base 48 and emitter 50 of transistor 34. In the circuit 1, limit switch 26 and manual switch 24 connect $L_1$ to the input lines 16 and 14, respectively. When both switches 26 and 24 are closed, for example, and during the AC half cycle when $L_1$ is negative with respect to $L_2$, current flowing from $L_2$ to $L_1$ is diverted from a path through resistor 52, diode 54, resistor 36, and diode 55 to a path comprising resistor 52, diode 56, and limit switch 26, and from a path through resistor 58, diode 60, resistor 36, and diode 55 to a path comprising resistor 58, diode 62, and manual switch 24 due to the lower impedance of the path through diode 56 and 62. With less resultant current flow through resistor 36 the voltage drop decreases and current flows through circuit 42, diode 64, and resistor 36. The same result can be accomplished by causing a signal like $L_1$ to be imposed on input 4 such as the feedback input even if switch 24 is subsequently opened. In a like manner resistors 38 or 40 can be conditioned to provide current flow in circuit 42.

When the predetermined voltage condition exists and transistor 34 conducts, current flows in current limiting resistor 66 to simultaneously charge capacitor 68 and provide current to the base 70 of transistor 72 through the base current limiting resistor 74. Because of biasing resistor 76, transistor 72 conducts thereby connecting output 2 to $L_1$ through level shifting diodes 78, 79, 80, AC isolation diode 55, and reverse voltage breakdown protection diode 84. During the next AC half cycle when $L_1$ is positive with respect to $L_2$ transistors 34 and 72 cease conducting, capacitor 68 slowly discharges through resistors 74 and 76 and various transistor leakage paths, and output 2 is connected to $L_2$ through resistor 86. During the next half cycle when $L_1$ is again negative with respect to $L_2$ the capacitor 68 performing a short duration memory function provides base drive current to transistor 72 to initially drive it into conduction. This in turn provides a feedback signal to input line 4 initially so that the input function of a "1" at line 4 and 16 is satisfied even if line 14 has gone back to a "0" state. If switch 26 remains closed, transistor 34 will conduct again, charging the capacitor 68 and so forth until such time as line 16 returns to "0", and the voltage drop on resistor 36 no longer provides for current flow in circuit 42. The signal generated at output 2 representing a signal condition is in reality not a full wave sine wave identical to $L_1$ but is a half wave rectified sine wave with negative peaks corresponding to the negative peaks of $L_1$. This low power signal would generally be incapable of driving an AC machine device, but it can be used just as $L_1$ can be used as a logic signal to drive input 4 and 5, for example.

If output 2 remains in he output condition representing a "1" state provided by switch 26 closed and the feedback combination just described representing a "1" state, and switch 32 is closed, current flowing from $L_2$ to $L_1$ is diverted from a path comprising resistor 88, diode 90, and resistor 92 to a lower impedance path comprising diode 94, input line 5, output line 2, diode 84, transistor 72, diodes 78-80, and diode 55 and from a path comprising resistor 96, diode 98, and resistor 92 to a lower impedance path comprising resistor 96, diode 100, and manual switch 32. With less resultant current in resistor 92 the voltage drop thereacross decreases and current will flow from $LR_2$ to $L_1$ through the base circuit 101 of transistor 102 comprising the parallel combination of coil 104 and capacitor 106, biasing resistor 108, base current limiting resistor 110, and reverse voltage protection diode 112. This base current causes transistor 102 to conduct and current flows in limiting resistor 113 toward $L_1$ thereby energizing relay coil 104 which activates relay contacts 114 and simultaneously charging capacitor 106. The contacts 114 in turn activate a conventional solid state Triac circuit 116 which can produce a high powered output on line 8 capable of driving a solenoid load 13 for example.

During the second AC half cycle when $L_2$ is negative with respect to $L_1$ no current flows in circuit 101 or in transistor 102 due to the incompatibility of junction polarities. During this time period the capacitor 106 serving as a short duration memory discharges through coil 104 thereby maintaining the coil 104 in the energized state until the next AC half cycle when $L_1$ is negative with respect to $L_2$ and the transistor 102 can conduct again.

The output 8 of the Triac circuit 116 is a full wave high power output capable of driving an AC load as well as being used as a logic signal if further signal processing were desired.

Thus it becomes obvious that the system disclosed can provide an unlimited number of logical operations incorporating high and low power signals, multiple inputs, multiple elements, and feedback control.

What is claimed is:

1. An alternating current logic control system comprising, a pair of conductors connected to an alternating current source, a plurality of input lines connected to first resistor means so that in response to a predetermined logic function presented at said input lines a predetermined voltage drop condition will be created across said first resistor means, third conductor circuit means connected to the said first resistor means in which electric current flows in response to the said predetermined voltage drop, capacitor means in said third conductor circuit means and in parallel with amplifier means each being respectively charged and energized when electric current flows in said third conductor circuit means, a feedback connection from the output of said amplifier means to any of a plurality of said input lines, and an output connection from the output of said amplifier to input lines of any similar logic control system so that various alternating current logic functions may be generated.

2. An alternating current logic control system of claim 1 wherein third conductor circuit means includes first transistor means connected to said first resistor means which conducts when the predetermined voltage drop occurs at said first resistor means, second resistor means in the said third conductor circuit means to establish said predetermined voltage level for conduction, third resistor means in said third conductor circuit means to provide electric current limiting when said first transistor conducts, diode means in said third conductor circuit means to provide reverse voltage breakdown protection and alternating current isolation for said first transistor means, and said first transistor means connected to said capacitor means to charge the same during conduction of said first transistor means.

3. An alternating current logic control system of claim 2, wherein said capacitor means charged during conduction of said first transistor means is a short duration memory means connected to the input of said amplifier means to provide current to the same during the initial time period when current polarity of said pair of conductors is again proper for said first transistor means to resume conduction, thus the feedback connection is maintained in the logic state previously generated when said first transistor means was conducting in response to a proper logical function on said input lines.

4. In an alternating current control system of claim 3, wherein said input lines include input diode means in each of said input lines to divert electric current in response to alternating current input signals from said first resistor means so that said predetermined voltage drop in said first resistor means can be accomplished, fourth resistor means connected to said input diode means to provide a normal predetermined current level in said first resistor means when electric current is not being diverted through said input diode means in response to said alternating current input signals.

5. An alternating current static control system of claim 4, wherein said amplifier means comprising second transistor means alternatingly driven into conduction by said first transistor means and said capacitor means.

6. An alternating current control system of claim 5, wherein said feedback connection includes a fourth conductor connecting the output of said amplifier means to any of a plurality of said input lines thereby providing a positive feedback circuit.

7. An alternating current logic control system of claim 5, wherein said output connection includes a fifth conductor connecting the output of said amplifier to any of a plurality of input lines of any other logic control element being electrically similar but logically diverse.

8. An alternating current logic control system of claim 4 wherein said amplifier means comprises inductively actuated relay means alternatingly actuated by conduction of said first transistor means and discharge of said capacitor means.

9. An alternating current logic control system of claim 8 wherein said feedback connection includes a fourth conductor connecting the output of said amplifier means to any of a plurality of said input lines thereby providing a positive feedback circuit.

10. An alternating current logic control system of claim 8, wherein said output connection includes a fifth conductor connecting the output of said amplifier means to an alternating current load.

* * * * *